United States Patent
Phillips et al.

(10) Patent No.: US 12,058,481 B2
(45) Date of Patent: *Aug. 6, 2024

(54) HYBRID MODULAR WIRELESS SENSOR

(71) Applicant: Watlow Electric Manufacturing Company, St. Louis, MO (US)

(72) Inventors: James B. Phillips, Lake Geneva, WI (US); Don Recupido, Crystal Lake, IL (US); Nathan Frost, McHenry, IL (US); Randy Scott Brown, Poplar Grove, IL (US)

(73) Assignee: Watlow Electric Manufacturing Company, St. Louis, MO (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/071,020

(22) Filed: Nov. 29, 2022

(65) Prior Publication Data

US 2023/0088861 A1 Mar. 23, 2023

Related U.S. Application Data

(63) Continuation of application No. 16/122,149, filed on Sep. 5, 2018, now Pat. No. 11,516,560, which is a
(Continued)

(51) Int. Cl.
*H04Q 9/00* (2006.01)
*G01D 11/24* (2006.01)
(Continued)

(52) U.S. Cl.
CPC ............ *H04Q 9/00* (2013.01); *G01D 11/245* (2013.01); *G01D 21/00* (2013.01); *H04L 41/082* (2013.01);
(Continued)

(58) Field of Classification Search
None
See application file for complete search history.

(56) References Cited

U.S. PATENT DOCUMENTS

| 11,516,560 | B2 * | 11/2022 | Phillips | ............... H04Q 9/00 |
| 2013/0154791 | A1 | 6/2013 | Srivastava et al. | |
| 2017/0316683 | A1 | 11/2017 | Pietrasik et al. | |

FOREIGN PATENT DOCUMENTS

| JP | 2014103667 A | 6/2014 |
| JP | 2017204226 A | 11/2017 |

OTHER PUBLICATIONS

First Examination Report issued to India counterpart Application No. 202117015687 mailed Nov. 25, 2022, 6 pages.
(Continued)

*Primary Examiner* — Thomas S McCormack
(74) *Attorney, Agent, or Firm* — Burris Law, PLLC

(57) ABSTRACT

A wireless sensor assembly incudes a housing, a wireless power source, a wireless communication component, and firmware. The housing defines a first aperture for receiving an external sensor and a second aperture defining a communication port configured to receive a wire harness. The wireless communications component and the firmware are powered by the wireless power source. The wireless communications component is configured to be in electrical communication with the external sensor and transmit data from the external sensor to an external device. The firmware is configured to manage a rate of data transmittal from the wireless communications component to the external device. The wireless power source, the wireless communications component, and the firmware are mounted within the same housing. The data from the external sensor is transmitted from the external sensor wirelessly through the wireless
(Continued)

communications component or through the wire harness to the external device for processing.

20 Claims, 18 Drawing Sheets

Related U.S. Application Data continuation-in-part of application No. 15/932,252, filed on Feb. 16, 2018, now Pat. No. 10,743,088.

(60) Provisional application No. 62/459,698, filed on Feb. 16, 2017.

(51) Int. Cl.
  *G01D 21/00* (2006.01)
  *H04L 41/082* (2022.01)
(52) U.S. Cl.
  CPC ..... *H04Q 2209/40* (2013.01); *H04Q 2209/80* (2013.01); *H04Q 2209/886* (2013.01)

(56) References Cited

OTHER PUBLICATIONS

Office Action issued in corresponding JP Application No. 2021-512430, issued Mar. 5, 2024, and a Brief Translation, 8 pages.
Office Action issued in corresponding JP Application 2021-512430, issued Aug. 29, 2023, and an English Translation, 6 pages.

* cited by examiner

HYBRID MODULAR WIRELESS SENSOR

CROSS-REFERENCE TO RELATED APPLICATIONS

This application is a continuation of U.S. application Ser. No. 16/122,149 filed Sep. 5, 2018 which is a continuation-in-part application of U.S. Ser. No. 15/932,252, filed Feb. 16, 2018 (now U.S. Pat. No. 10,743,088), which claims priority to and the benefit of U.S. Provisional Application Ser. No.: 62/459,698 filed on Feb. 16, 2017. The disclosure of the above applications are incorporated herein by reference in its entirety.

FIELD

The present disclosure relates generally to sensor assemblies, and more particularly to wireless sensor assemblies.

BACKGROUND

The statements in this section merely provide background information related to the present disclosure and may not constitute prior art.

Sensors are used in a wide variety of operational environments to monitor operating and environmental characteristics. These sensors can include temperature, pressure, velocity, position, motion, current, voltage, and impedance sensors, by way of example. The sensors are placed in operational environment being monitored and are designed to generate an electrical signal or have a change in the electrical characteristics in response to a change in the monitored operating or environment characteristic. The change in the electrical characteristics in the sensors may be a change in impedance, voltage or current.

A sensor typically includes a probe and a processing unit. The probe acquires data from the environment and transmits the data to the processing unit, which, in turn, determines the measurements and provides a reading to a user. The processing unit generally requires a significant amount of power from a power source during data processing. The power source may be an integrated battery or may be an external power source connected to the sensor by wires. The sensor cannot be made small with the integrated battery and the processing unit. When the sensor is connected to an external power source by wires, it is difficult to use the sensor in harsh environment or to properly mount the sensor to an apparatus with complicated structure.

Although some known processing units include low-power microprocessors, these microprocessors consume a high amount of power during start-up. In some applications where energy harvesting is important, the initial amount of power consumed at start-up by the low-power microprocessors can drain an excessive amount of energy and cause a start-up failure.

These issues with power consumption and harvesting, among other issues with the operation of electronic sensors, is addressed by the present disclosure.

SUMMARY

In one form, a wireless sensor assembly incudes a housing, a wireless power source, a wireless communication component, and firmware. The housing defines a first aperture for receiving an external sensor and a second aperture defining a communication port configured to receive a wire harness. The wireless communications component and the firmware are powered by the wireless power source. The wireless communications component is configured to be in electrical communication with the external sensor and transmit data from the external sensor to an external device. The firmware is configured to manage a rate of data transmittal from the wireless communications component to the external device. The wireless power source, the wireless communications component, and the firmware are mounted within the same housing. The data from the external sensor is transmitted from the external sensor wirelessly through the wireless communications component or through the wire harness to the external device for processing.

In other features, the wireless power source is an energy harvesting device. The firmware controls the rate of data transmittal from the wireless communications component to ensure that an average power consumption is within the capability of the energy harvesting device. The wireless sensor assembly defines a volume less than 2 in$^3$.

In another form, the wire harness is configured to transmit data from the external sensor to another external device for preventive maintenance purposes. In this form, the another external device may selected from a group consisting of an Engine Control Unit and a computer.

In still another form, the communication port is also configured to receive a removable dongle, and the wireless communications component may be provided in the removable dongle.

In another form, the communication port is configured to be adapted for both the wire harness and a removable dongle.

In another form, the housing includes a main body, a first tubular portion and a second tubular portion extending from the main body along a direction parallel to a longitudinal axis of the main body. In this form, the first tubular portion and the second tubular portion may extend from opposing ends of the main body and may be offset from the longitudinal axis of the main body.

In another form, the electronics are powered exclusively by the wireless power source, and the wireless power source may be selected from the group consisting of a self-powering device, a thermoelectric device, and a battery. The self-powering device may be a vibration device comprising a piezo-electric device mounted to a cantilevered board.

In yet another form, the wireless sensor assembly further includes a communication connector received in the second aperture, and the communications connector may be selected from the group consisting of USB, USB-C, Ethernet, CAN, and Aspirated TIP/Ethernet.

In other various forms, the external sensor may be selected from the group consisting of a temperature sensor, a pressure sensor, a gas sensor, and an optical sensor, and/or the wireless communications component may be selected from the group consisting of a Bluetooth module, a WiFi module, and a LiFi module.

In another form, the external sensor may include an identification code, and during installation or replacement of the wireless sensor assembly, calibration information of the external sensor can be accessed through an external device in wireless communication with the wireless sensor assembly. In this form, the identification code may be an RFID tag and/or a barcode, and the wireless communications component may send data to the external device that performs functions selected from the group consisting of data logging, computations, and re-transmitting the data to a remote device for processing.

In another form, the wireless power source is a battery, and the firmware controls a rate of data transmittal from the wireless communications component as a function of battery life.

Further areas of applicability will become apparent from the description provided herein. It should be understood that the description and specific examples are intended for purposes of illustration only and are not intended to limit the scope of the present disclosure.

DRAWINGS

The present disclosure will become more fully understood from the detailed description and the accompanying drawings, wherein.

Corresponding reference numerals indicate corresponding parts throughout the several views of the drawings.

DETAILED DESCRIPTION

The following description is merely exemplary in nature and is not intended to limit the present disclosure, application, or uses.

First Form

Figure 1:
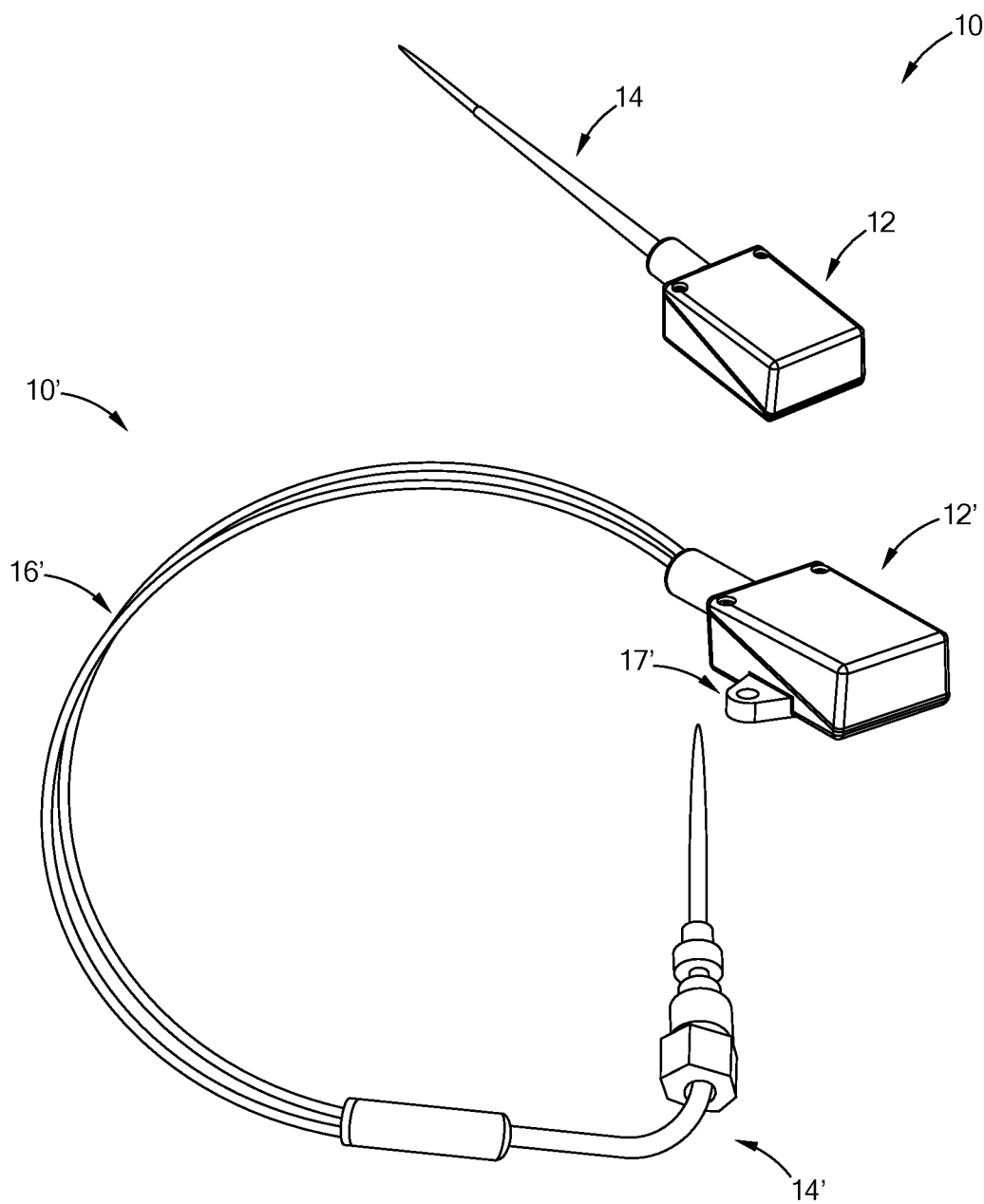
FIG. 1 is a perspective view of two wireless sensor assemblies constructed in accordance with the present disclosure.

Referring to FIG. 1, a wireless sensor assembly 10 constructed in accordance with a first form of the present disclosure generally includes a housing 12 and a sensor 14. The sensor 14 may be inserted into an aperture (not shown in FIG. 1) and connected to electrical and electronic components inside the housing 12. Alternatively, a wireless sensor assembly 10' according to a variant of the first form may include a housing 12', a sensor 14', and wires 16' that connect the sensor 14' to the electrical and electronic components inside the housing 12'. The housing 12' may further include a pair of tabs 17' for mounting the housing 12' to an adjacent mounting structure (not shown). The sensor 14 or 14' may be a temperature sensor, a pressure sensor, a gas sensor, and an optical sensor, by way of example.

Figure 2:
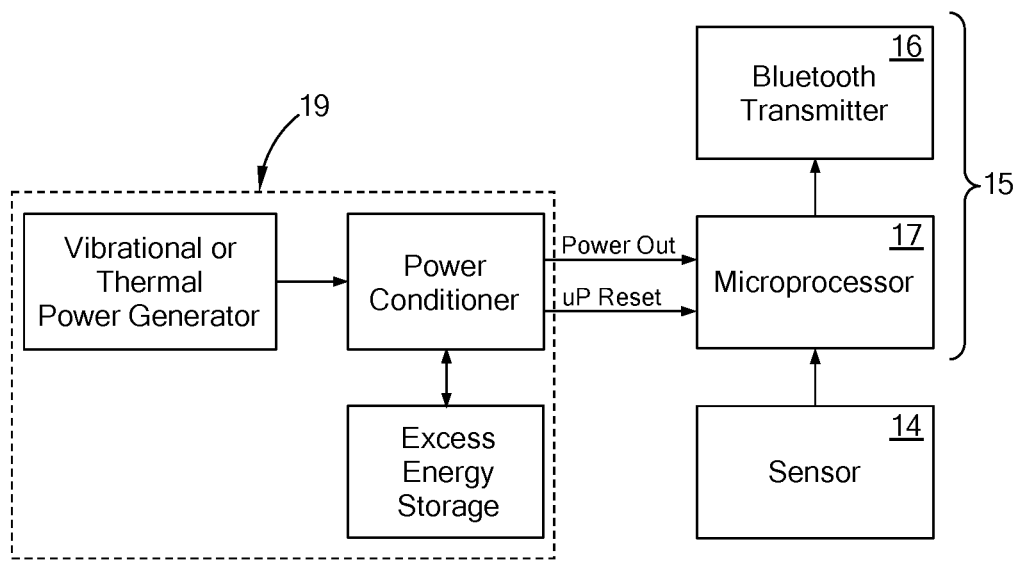
FIG. 2 is a schematic diagram of electronics and one form of a wireless power source in accordance with the teachings of the present disclosure.

Referring to FIG. 2, exemplary electronic components inside the housing 12/12', among other components, are shown in schematic form. The electronics 15 generally include a wireless communications component 16, which in this form is shown as a Bluetooth® RF Transmitter, and firmware 17 configured to manage a rate of data transmittal from the wireless communications component 16 to an external device (not shown). The firmware 17 resides in the microprocessor in this form. As further shown, a wireless power source 19 provides power to the electronics 15. The power source 19 may take on any number of forms, including a battery as described in greater detail below. In this form, the power source 19 includes an "energy harvesting" configuration, which includes a vibrational or thermal power generator (described in greater detail below), a power conditioner, and a storage component to store excess energy.

The firmware 17 may also be configured to manage power consumed at initial start-up of the microprocessor. Low-power microprocessors typically consume an initial large burst of power on the order of 1 second or less during startup before entering true low-power mode. In an energy harvesting application dependent on a low-power mode of the microprocessor to function properly, the initial startup power burst may prove insurmountable, draining the stored energy before the initial power burst is over, causing startup failure. To address this issue of an initial start-up surge, the firmware 17 may be modified to spread out the initial energy burst over time such that an average power consumption is within the capability of the energy harvesting configuration. Although this spreading out of energy over time will delay start-up of the microprocessor, the stored energy will not be drained, thus inhibiting a startup failure.

In another form, additional circuitry may be added to the microprocessor to delay the output logic signal from asserting until there is enough stored energy on the storage device such that the energy harvesting components/module can get through the initial power surge. This may take the form of an external delay element or be a part of the microprocessor with a power conditioning chip. In one form, when there is ample vibrational or thermal energy available, start-up can begin without spreading burst of energy, whereas with little vibrational or thermal energy present, the energy bursts can be spread over time. In other words, the electronics may be configured to delay an output logic signal from asserting until there is sufficient stored energy to sustain an initial power surge. These and other data management functions within the processor and firmware 17 are described in greater detail below.

Figure 3:
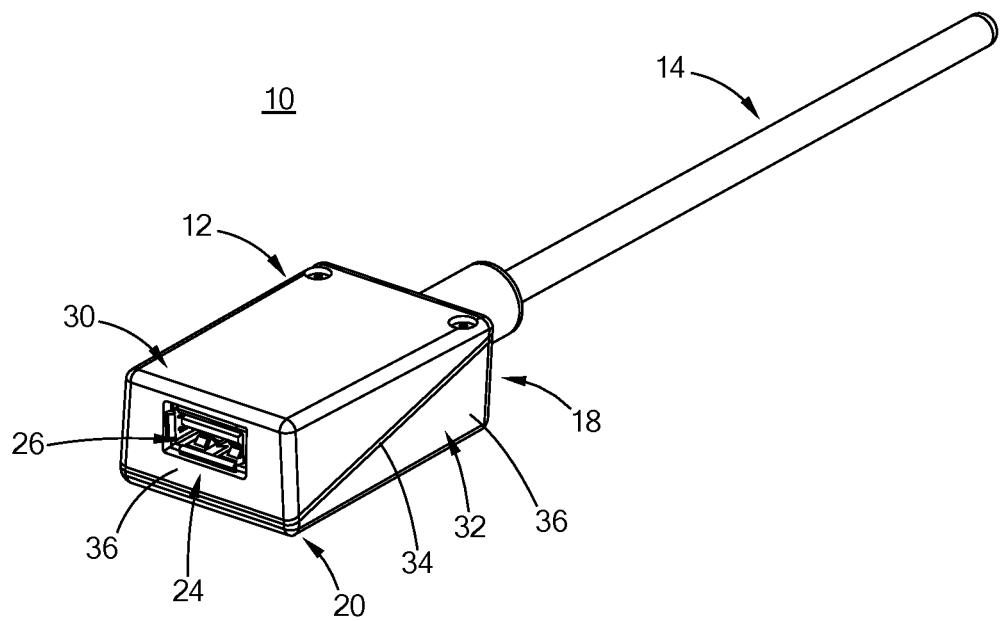
FIG. 3 is another perspective view of the wireless sensor assembly of the first form.
Figure 4:
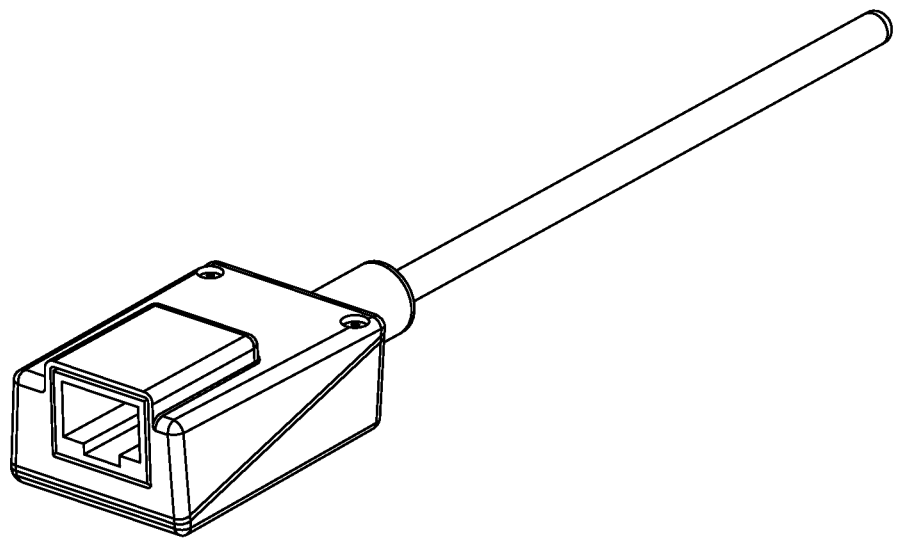
FIG. 4 is another variant of a wireless sensor assembly of the first form.
Figure 5:
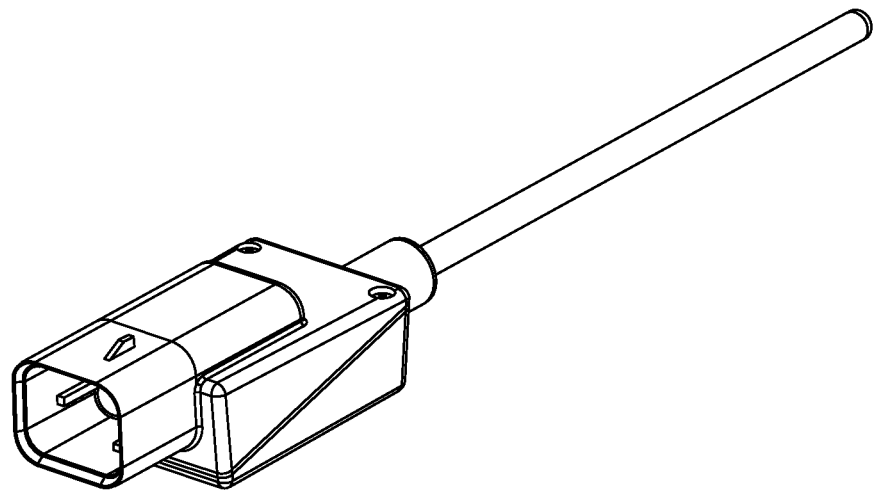
FIG. 5 is still another variant of a wireless sensor assembly of the first form.

Referring to FIG. 3, the housing 12 has opposing first and second ends 18 and 20, defining a first aperture 22 (shown in FIG. 6) and a second aperture 24, respectively. The sensor 14 has a longitudinal end inserted into the first aperture 22 and connected to the electrical and electronic components mounted within the housing 12. A communication connector 26 is disposed in the second aperture 24 and is configured to receive a mating communication connector (not shown). The second aperture 24 and the communication connector 26 may be configured differently depending on the type of the mating communication connector to be connected. For example, the communication connector 26 may be configured to form a Universal Serial Bus (USB) port (FIG. 3), a USB-C port, an Ethernet port (FIG. 4), a Controller Area Network (CAN) bus port (FIG. 5) and Aspirated TIP/Ethernet port, among others. The outer profile of the housing 12 may be configured accordingly to accommodate the shape of the communication connector 26. The mating communication connector is optional and may be used to transmit raw sensing data acquired by the sensor 14, through a network, to an external or remote device (not shown) for further processing. Alternatively, the raw sensing data acquired by the sensor 14 may be transmitted to the external device or remote device wirelessly, which will be described in more detail below.

As further shown in FIG. 3, the housing 12 includes an upper portion 30 and a lower portion 32, each of the portions defining mating wedges that accommodate internal components and external features at opposing ends 18, 20. The lower portion 32 of the housing 12 may define the first aperture 22, whereas the upper portion 30 of the housing 12 may define the second aperture 24, or vice versa. The mating wedges of the upper portion 30 and the lower portion 32 define a sealing interface 34 along opposed lateral sidewalls 36. The sealing interface 34 between the upper and lower portions 30, 32 is angled so that the first aperture 22 is defined solely by the lower portion 32 (or alternatively by the upper portion 30), rather than jointly by the upper and lower portions 30, 32. As such, sealing of the sensor 14 to the housing 12 can be made relatively easy since the sensor 14 is sealed to only the lower portion 32, as opposed to multiple pieces (i.e., both the upper portion 30 and the lower portion 32).

Figure 6:
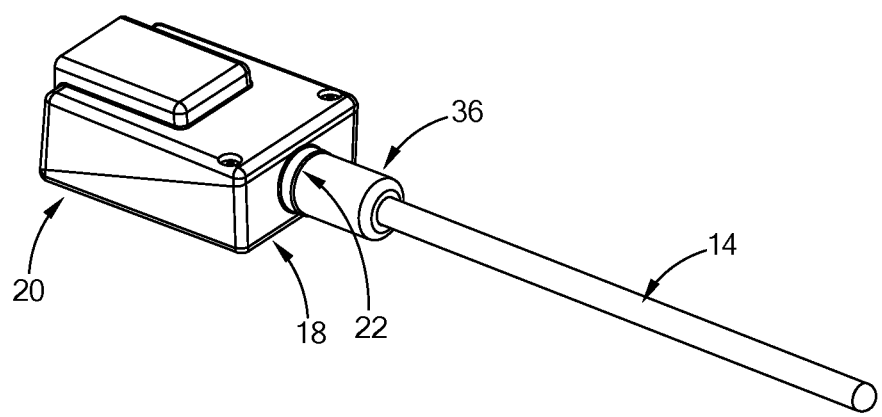
FIG. 6 is another perspective view of the wireless sensor assembly of FIG. 4.
Figure 7:
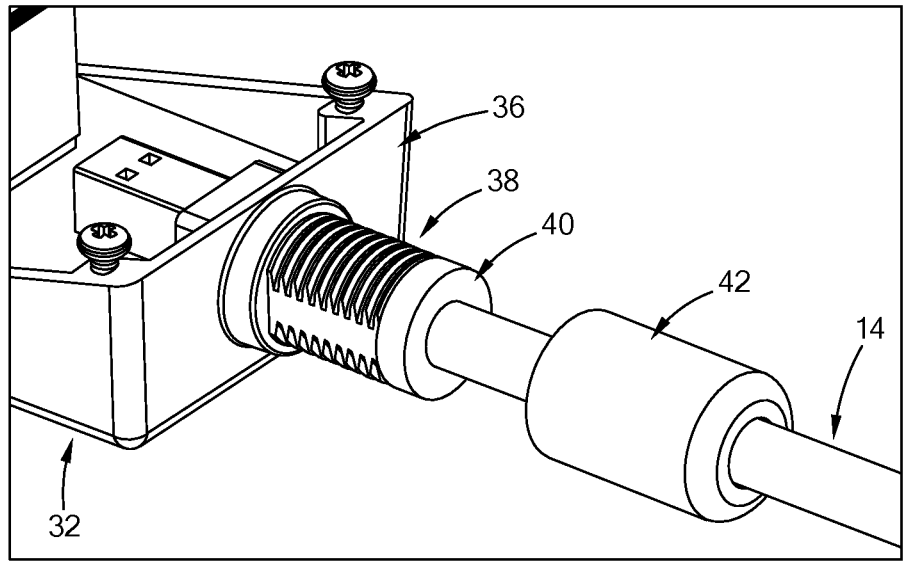
FIG. 7 is a partial detailed view of the wireless sensor assembly of the first form, showing components inside the housing.

Referring to FIGS. 6 and 7, the wireless sensor assembly 10 further includes a mounting assembly 36 for mounting the sensor 14 to the housing 12. The mounting assembly 36 includes a boss 38, a compression seal 40 at a free end of the boss 38, and a nut 42. The sensor 14 is inserted through the boss 38, the compression seal 40 and the nut 42. By securing the nut 42 around the boss 38 and the compression seal 40, the sensor 14 is secured and sealed to the housing 12. The nut 42 may be secured to the boss 38 via threaded connection, press-fit connection or push-on connection. The boss 38 may be a separate component that is inserted into the first aperture 22 or may be formed as an integral part of the lower portion 32 of the housing 12.

Figure 8:
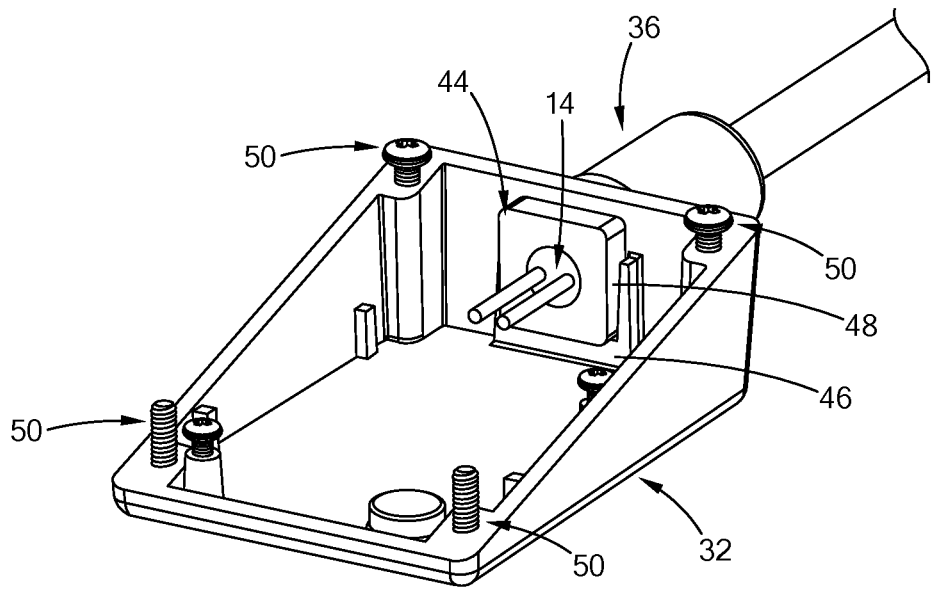
FIG. 8 is a top perspective of a lower portion of a housing of the wireless sensor assembly of the first form, with a sensor connected to the lower portion of the housing.

Referring to FIG. 8, the wireless sensor assembly 10 further includes an anti-rotation mechanism 44 disposed inside the housing 12, particularly in the lower portion 32 to prevent the sensor 14 from rotating when the sensor 14 is subjected to vibration. The anti-rotation mechanism 44 includes a U-shaped seat 46 protruding from an interior surface of the lower portion 32, and an anti-rotation nut 48 disposed in the seat 46.

The wireless sensor assembly 10 further includes securing features 50 for securing the lower portion 32 to the upper portion 30. The securing features 50 may be screws and holes as shown in FIG. 8. Alternatively, the upper and lower portions 30 and 32 may be secured by vibration welding, snap-fit, or any other joining methods known in the art. The upper and lower portions 30 and 32 may also include alignment features for aligning the upper and lower portions 30 and 32 during assembly.

Figure 9:
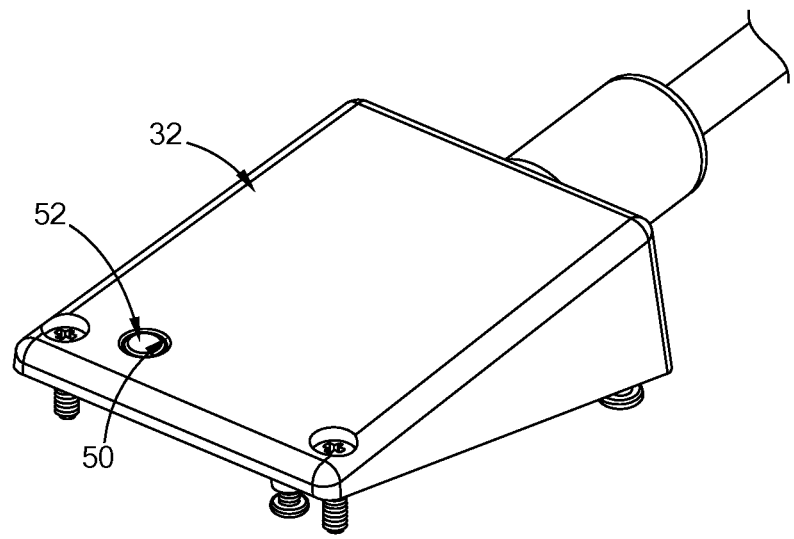
FIG. 9 is a bottom perspective view of a lower portion of a housing of the wireless sensor assembly of the first form, with a sensor connected to the lower portion of the housing.

Referring to FIG. 9, the lower portion 32 may further include a recess 50 defined in a bottom surface and a magnet 52 received in the recess 50. The external magnet 52 is operable for communication with the electrical and electronic components inside the housing 12 to disable and enable the sensor 14. The magnet 52 may be used to open a reed switch disposed inside the housing 12 during shipping to disable the sensor 14 and preserve battery life if a battery is provided inside the housing 12. During shipment, a small piece of adhesive tape may be placed over the magnet 52. To make the sensor 14 operable, the adhesive tape and the magnet 52 may be removed to allow for power supply from the battery to the sensor 14. The electrical and electronic components may include a latching circuitry to prevent the sensor 14 from being disabled if it were to encounter a strong magnetic field again. In addition, the recessed area around the recess 50 may serve as a "light pipe" for an indicator LED that can be used to show the functional status of the sensor 14. The plastic housing material in this area may be made thinner than other parts of the housing 12 to allow the indicator LED to be seen through the plastic housing material.

Figure 10:
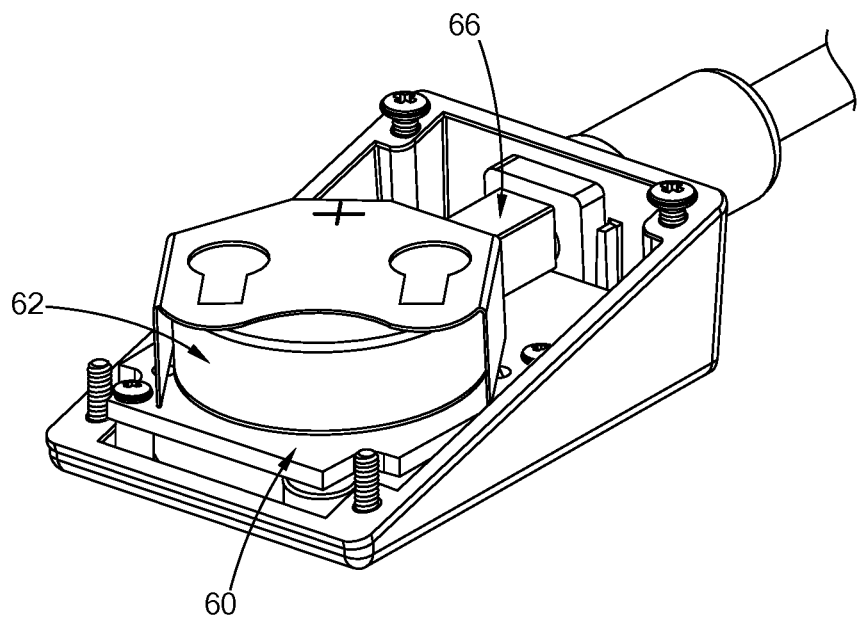
FIG. 10 is a perspective view of the wireless sensor assembly of the first form, with an upper portion of a housing removed to show components inside the housing.
Figure 11:
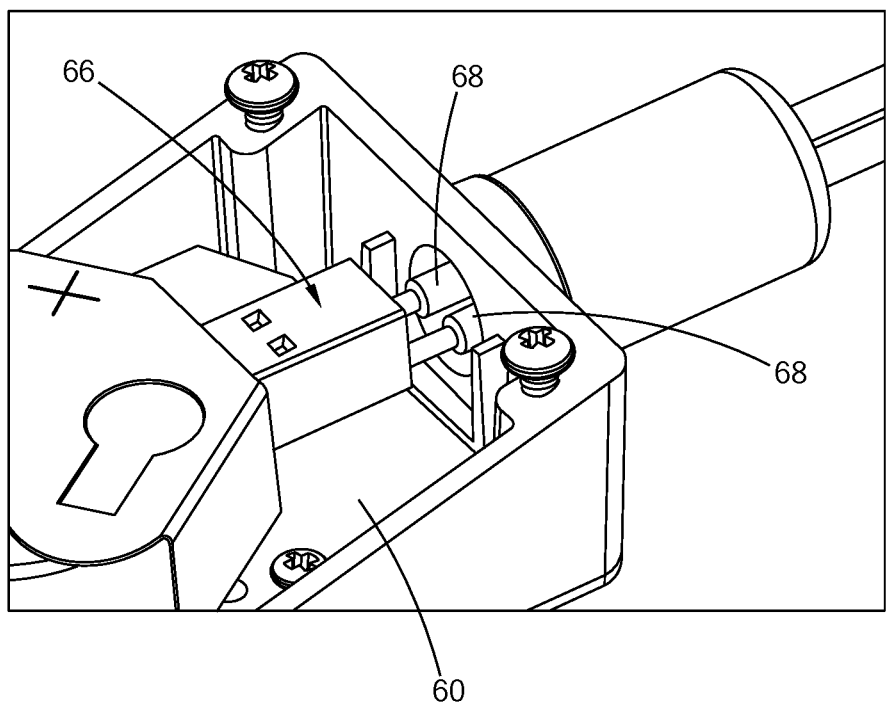
FIG. 11 is a partial enlarged view of FIG. 10.
Figure 12:
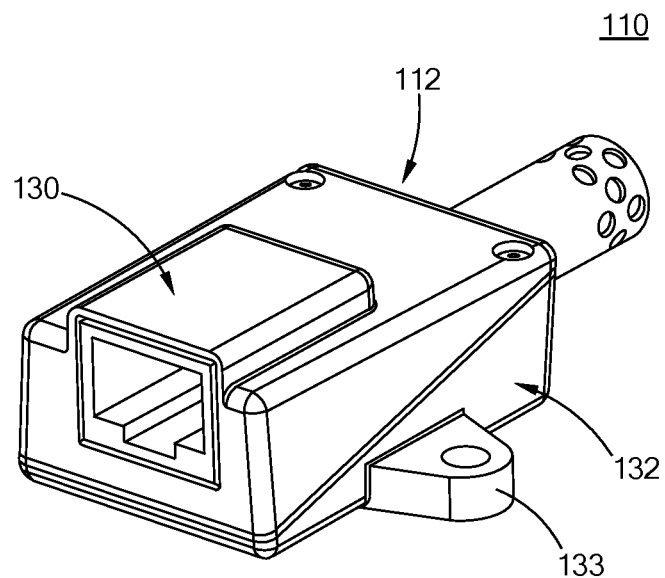
FIG. 12 is a perspective view of a wireless sensor assembly constructed in accordance with a second form of the present disclosure.
Figure 13:
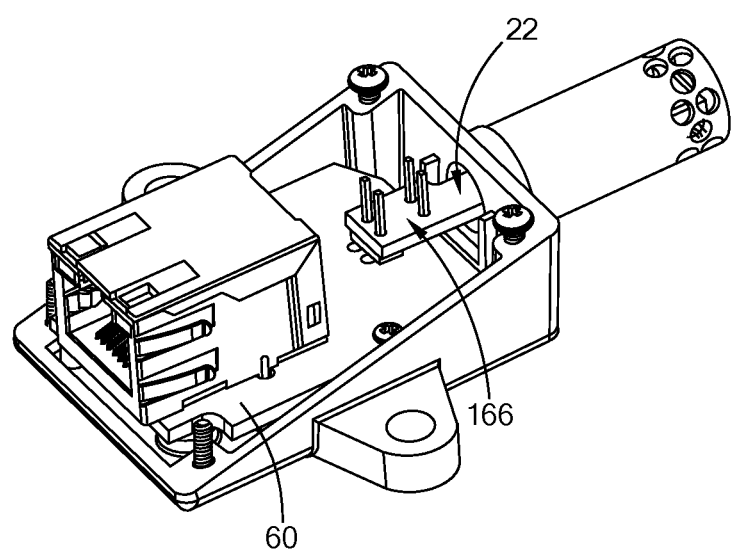
FIG. 13 is a perspective view of a wireless sensor assembly of a second form, with an upper portion of a housing removed to show components inside the housing.
Figure 14:
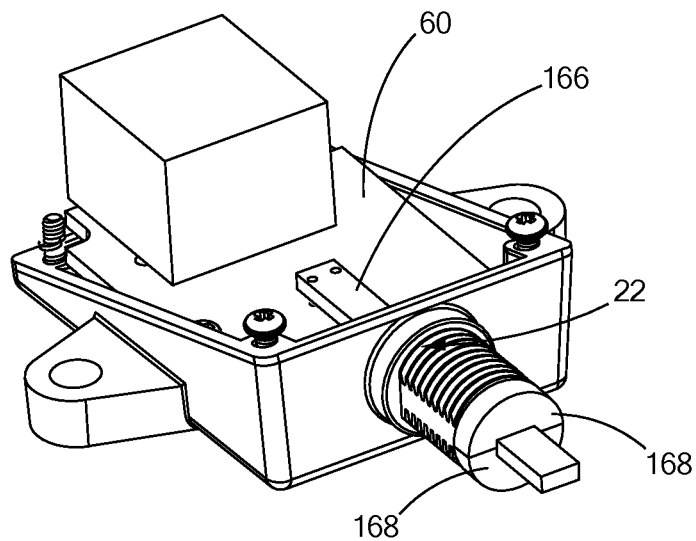
FIG. 14 is another perspective view of a wireless sensor assembly of a second form, with an upper portion of a housing removed to show components inside the housing.

Referring to FIGS. 10 and 11, the wireless sensor assembly 10 includes electrical and electronic components disposed in an interior space defined by the housing 12 and connected to the sensor 14 and the communication connector 26 (shown in FIG. 3). The electrical and electronic components may include a communication board 60, a wireless power source 62, a wireless communications component, firmware (not shown), and a sensor connector 66 for connecting the sensor 14 to the communication board 60. The communication board 60 is a printed circuit board. The wireless power source 62, the wireless communications component, and the firmware are mounted on the communication board 60.

Signals from the sensor 14 are transmitted to the communication board 60 via the sensor connector 66. As clearly shown in FIG. 11, the wires 68 of the sensor 14 are directly connected to the sensor connector 66, which is mounted on the communication board 60. The wireless communications component on the communications board 60 sends data to the external device (i.e., an external processing device) for data processing. The external device performs functions of data logging, computations, or re-transmitting the data to another remote device for further processing. The sensor 14 only collects raw data and transmits the raw data to the external or remote device before going to sleep. All sensing calculations, calibration adjustments, error checking, etc., are performed on the external or remote device so as not to use up any stored energy in the wireless power source 62 disposed within the housing 12. As such, the battery life can be conserved.

The electrical and electronic components within the housing 12 are configured to receive power from the wireless power source 62 and to be in electrical communication with the sensor 14. The wireless communications component has a power consumption less than about 0.5 mW. The electrical and electronic components disposed within the housing 12 are powered exclusively by the wireless power source 62. The wireless power source 62 may be a battery or a self-powering device, among others. The self-powering device may be a thermoelectric device or a vibration device comprising a piezo-electric device mounted to a cantilevered board.

In one form, the wireless sensor assembly 10 defines a volume less than about 2 in$^3$. The wireless communications component is configured to transmit raw data from the external sensor 14 to an external or remote device, such as a tablet, a smartphone, a personal computer, a cloud computer center, or any processing device that can process the data transmitted from the wireless communications component. The wireless communications component is selected from the group consisting of a Bluetooth module, a WiFi module, and a LiFi module. The firmware is configured to manage a rate of data transmitted from the wireless communications component to the external or remote device. The firmware controls a rate of data transmitted from the wireless communications component as a function of battery life. The firmware also controls a processor clock to conserve power for the wireless power source. The firmware further monitors stored energy in the wireless power source 62 and adjusts a rate of data transmission from the wireless communications component as a function of an amount of stored energy. This may be analogous to a low power mode in order to preserve stored energy. As such, the battery life may be conserved and besides, the sensor 14 may be prevented from being turned off due to loss of power or at least being delayed. The rate of data transmission may return to a predetermined normal rate until more thermal or vibration energy is available to recharge the wireless power source 62.

Second Form

Referring to FIGS. 12 to 15, a wireless sensor assembly 110 in accordance with a second form of the present disclosure has a structure similar to that of the wireless sensor assembly 10 of the first form except for the structure of the housing and the sensor. Like components will be indicated by like reference numerals and the detailed description thereof is omitted herein for clarity.

Figure 15:
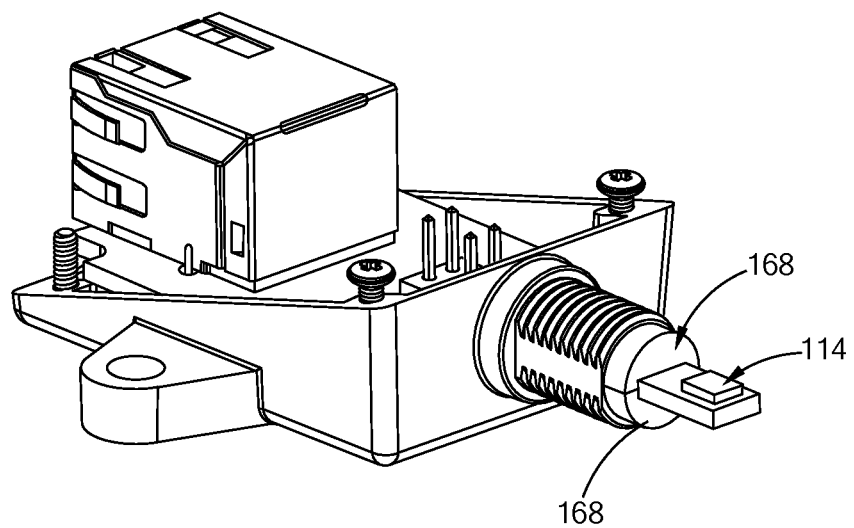
FIG. 15 is still another perspective view of a wireless sensor assembly of a second form, with an upper portion of a housing removed to show components inside the housing.

More specifically, the wireless sensor assembly 110 includes a housing 112 and a sensor 114 (shown in FIG. 15). The housing 112 includes an upper portion 130 and a lower portion 132. The lower portion 132 includes a pair of tabs 133 for mounting the housing 112 to an adjacent mounting structure. The sensor 114 is a board mount sensor. The electrical and electronic components received inside the housing 112 include a communication board 60 and a daughter board 166 mounted on the communication board 60. The board mount sensor 114 is also mounted on the daughter board 166. The daughter board 166 extends through the first aperture 22, with one end extending outside the housing 112 and another end extending inside the housing 112. Signals from the sensor 114 are transmitted to the communication board 60 via a daughter board 166. The daughter board 166 is supported by a pair of rubber gaskets 168. The pair of gaskets 168 also provide a compression seal between the daughter board 166 and the lower portion 132 of the housing 112.

Third Form

Figure 16:
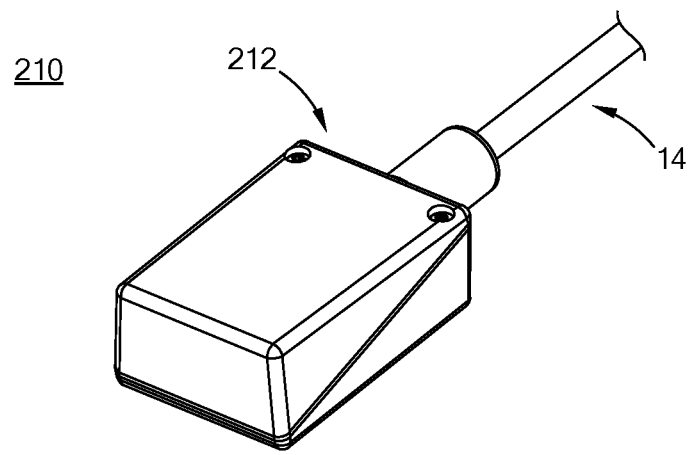
FIG. 16 is a perspective view of a wireless sensor assembly constructed in accordance with a third form of the present disclosure.

Referring to FIG. 16, a wireless sensor assembly 210 constructed in accordance with a third form of the present disclosure generally includes a housing 212 having a structure similar to that of the housing 12 of the first form, except that no second aperture is defined in the housing 212 to receive a communication connector to form a communication port. Like the wireless sensor assemblies 10 and 110 of the first and second forms, the wireless sensor assembly 210 includes similar electrical and electronics components for wireless communications with an external or remote device and for transmitting the raw data from the sensor 14, 114 to the external or remote device. As such, no communication port is necessary.

Fourth Form

Figure 17:
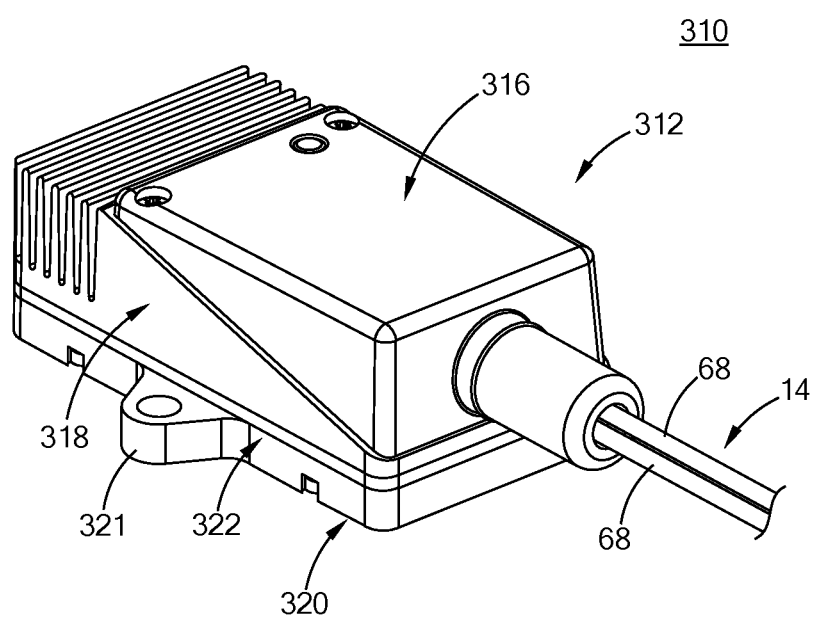
FIG. 17 is a perspective view of a wireless sensor assembly constructed in accordance with a fourth form of the present disclosure.
Figure 18:
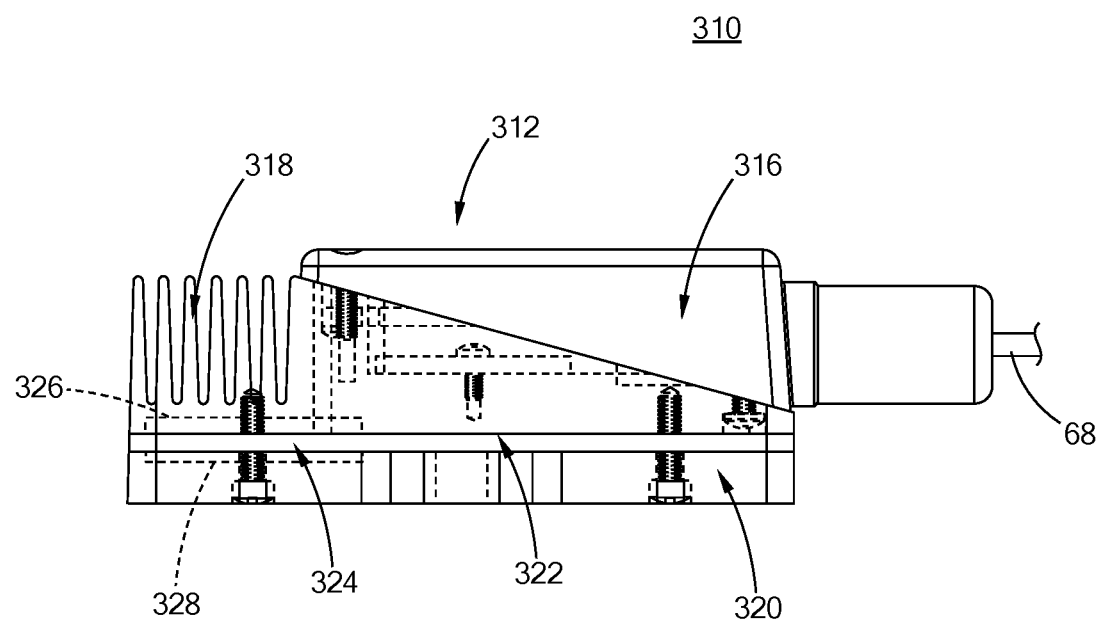
FIG. 18 is a partial, cross-sectional view of a wireless sensor assembly of the fourth form.

Referring to FIGS. 17 and 18, a wireless sensor assembly 310 in accordance with a fourth form of the present disclosure includes a housing 312 and a sensor 14 having a pair of wires 68. The housing 312 includes a top housing portion 316, a heat sink structure 318, and a lower base 320. The top housing portion 316 has a structure similar to the lower portion 32 of the first form, but is attached to the heat sink structure 318 in an inverted fashion. An insulation layer 322 is disposed between the heat sink structure 318 and the lower base 320. The lower base 320 defines a pair of tabs 321 for mounting the housing 312 to an adjacent mounting structure.

In this form, the wireless sensor assembly 310 does not include a battery. Instead, the electrical and electronic components inside the housing 310 and the sensor 14 outside the housing 312 are self-powered, for example, by a thermoelectric generator (TEG) 324, which is disposed within the housing 312. The TEG 324, also called a Seebeck generator, is a solid state device that converts heat (temperature differences) directly into electrical energy through a phenomenon called the Seebeck effect. The TEG 324 includes a first metallic plate 326 adjacent to the heat sink structure 318 and disposed above the insulation layer 322, and a second metallic plate 328 disposed below the insulation layer 322. The insulation layer 322 separates the first and second metallic plates 326 and 328. Part of the heat generated from the electrical and electronics are conducted to the first metallic plate 326 and is dissipated away by the heat sink structure 318. Another part of the heat generated by the electrical and electronic components inside the housing 312 is conducted to the second metallic plate 328. A temperature difference occurs between the first and second metallic plates 326 and 328, thereby generating electricity to power the electrical and electronic components inside the housing 312 and the sensor 14 outside the housing 312.

Fifth Form

Figure 19:
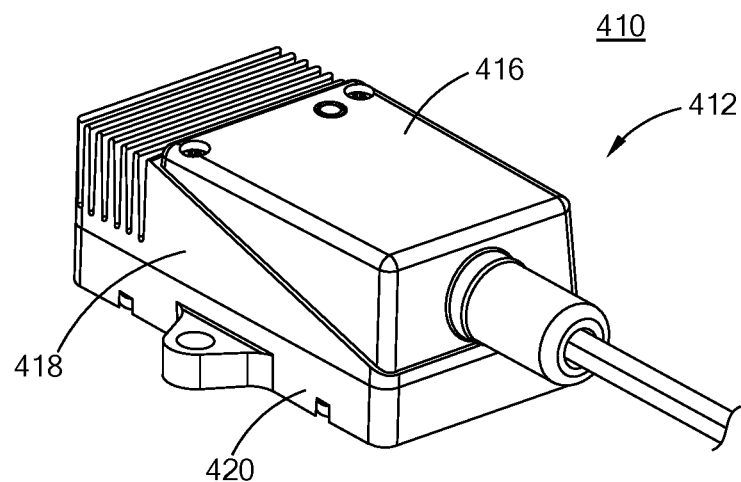
FIG. 19 is a perspective view of a wireless sensor assembly constructed in accordance with a fifth form of the present disclosure.
Figure 20:
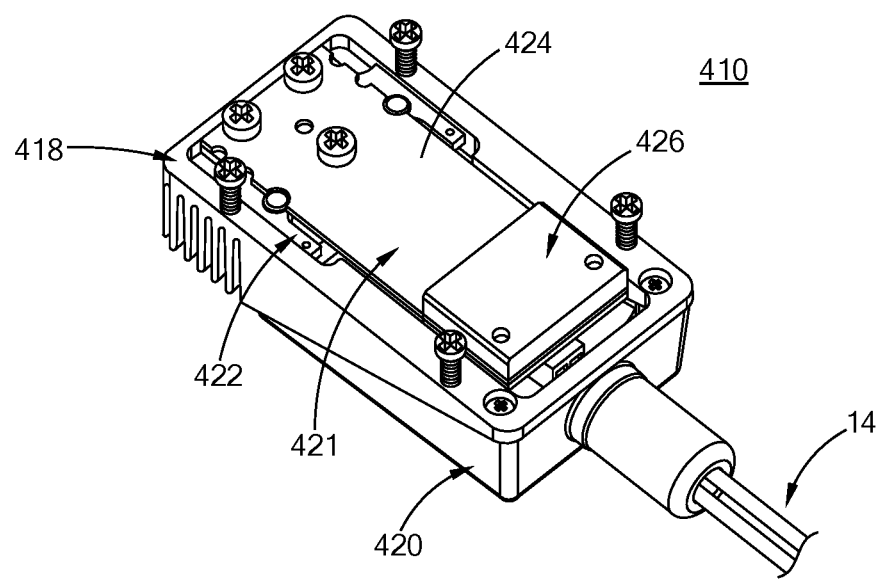
FIG. 20 is a perspective view of a wireless sensor assembly of the fifth form, with an upper portion removed to show components inside the housing.
Figure 21:
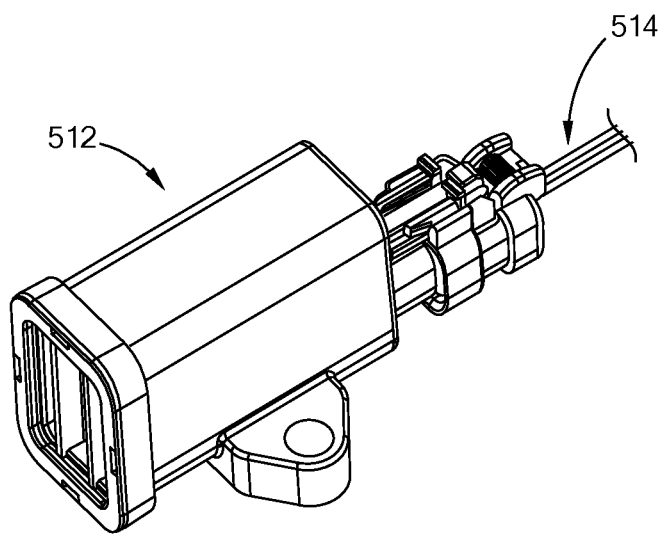
FIG. 21 is a perspective view of a wireless sensor assembly constructed in accordance with a sixth form of the present disclosure.
Figure 22:
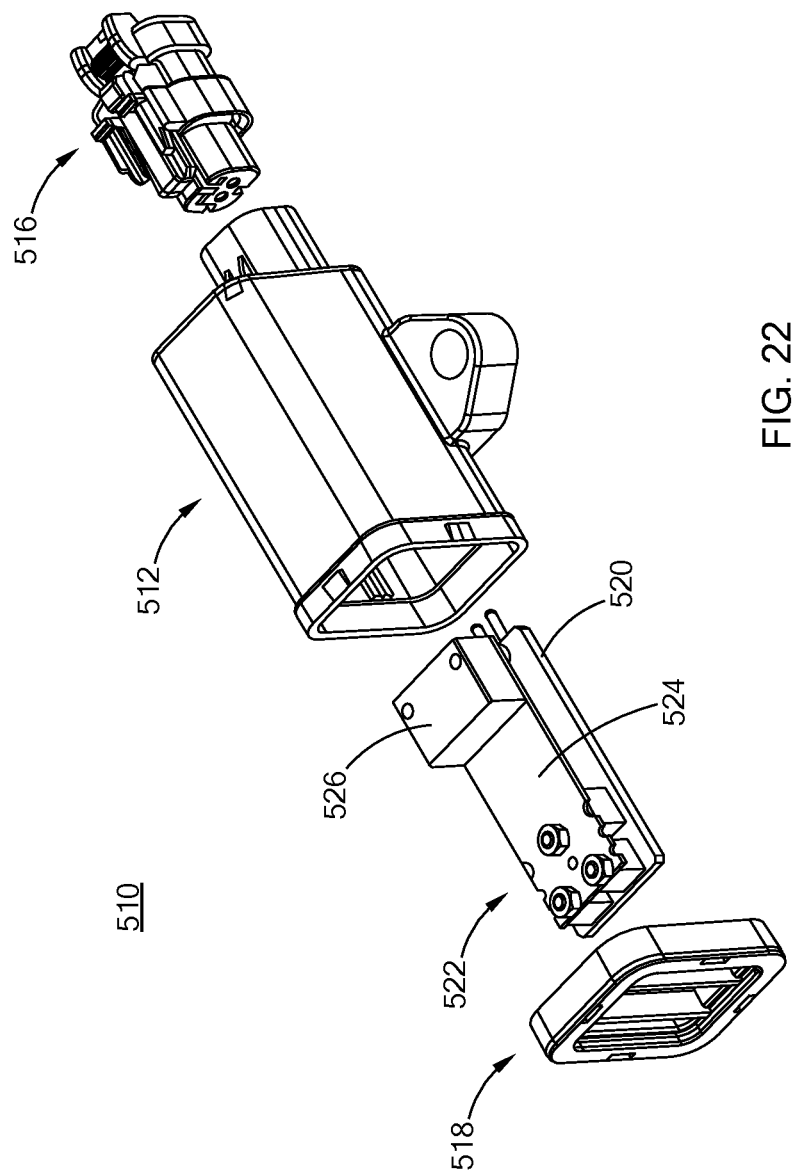
FIG. 22 is an exploded view of a wireless sensor assembly constructed in accordance with a sixth form of the present disclosure.
Figure 23:
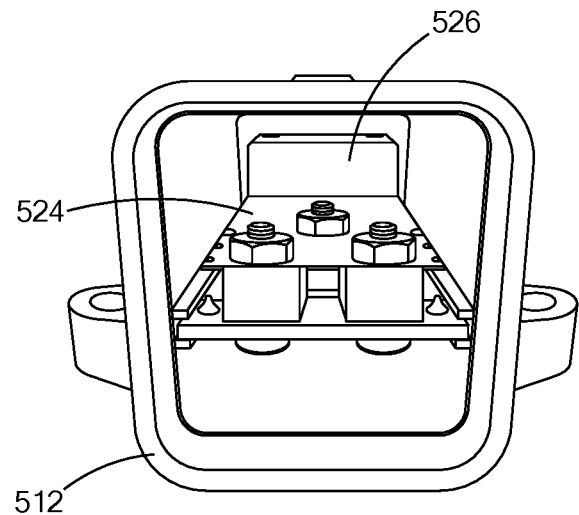
FIG. 23 is a front view of the wireless sensor assembly with a cap removed to show components inside the wireless sensor assembly of the sixth form.
Figure 24:
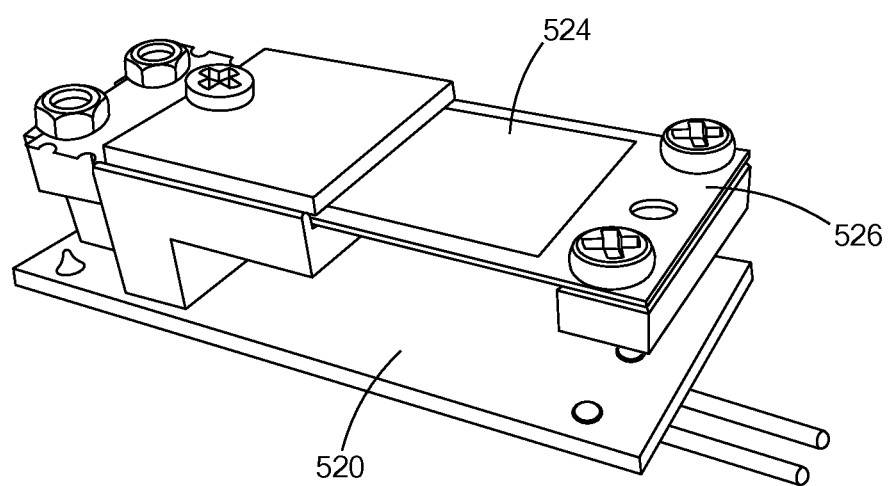
FIG. 24 is a perspective view of electrical and electronic components disposed inside the housing of the wireless sensor assembly of the sixth form.
Figure 25:
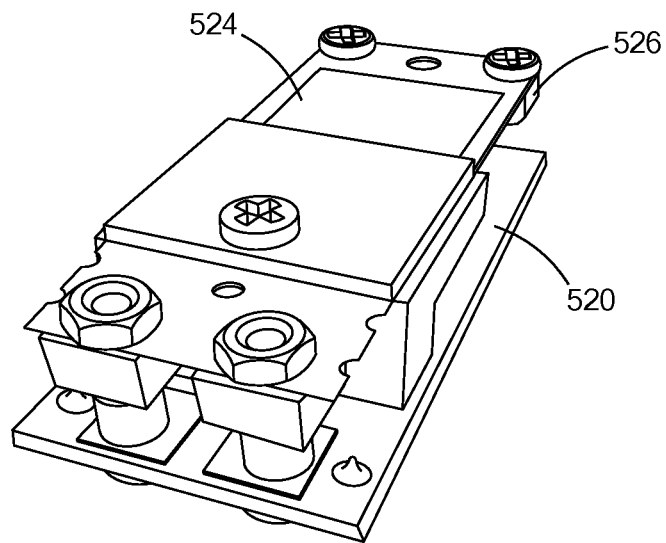
FIG. 25 is another perspective view of the electrical and electronic components of FIG. 24.
Figure 26:
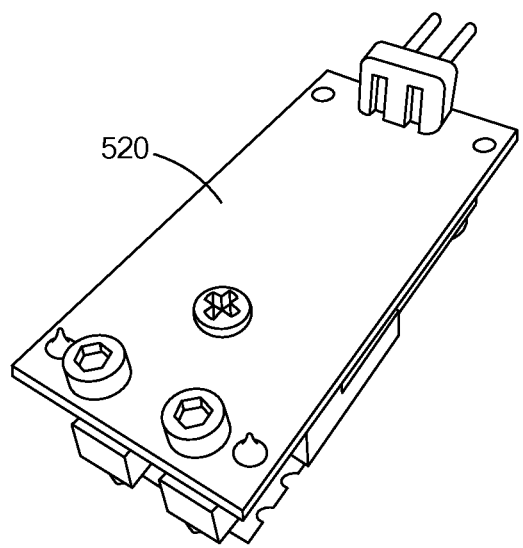
FIG. 26 is a bottom perspective view of the electrical and electronic components of FIG. 24.

Referring to FIGS. 19 and 20, a wireless sensor assembly 410 constructed in accordance with a fifth form of the present disclosure has a structure similar to that of the fourth form, differing only in the self-powering device. In this form, the self-powering device is a piezoelectric generator (PEG) 421, which converts mechanical strain into electric current or voltage to power the electrical and electronic components inside the housing and the sensor 14 outside the housing. The strain can come from many different sources, such as human motion, low-frequency seismic vibrations, and acoustic noises. In the present form, the PEG 421 includes a power transfer printed circuit board (PCB) 422, a metallic plate 424, and a weight 426 attached to an end of the metallic plate 424. The metallic plate 424 functions as a cantilevered board with the weight 426 disposed at the end to cause mechanical strain in the metallic plate 424. The mechanical strain generated in the metallic plate 424 is converted into power/electricity, which is routed to the communications board (not shown in FIG. 20) via the power transfer PCB 422. The power transfer PCB 422 is clamped between the heat sink structure 318 and the metallic plate 424. Like the housing 312 in the fourth form, the housing 412 of the present form includes a top housing portion 416, a heat sink structure 418, and a lower base 420. The heat sink structure 418 in this form, however, only functions as a mounting structure for the sensor 14 and the PEG 421 because heat has no effect in generating electricity. Therefore, no insulation layer is provided between the heat sink structure 418 and the lower base 420.

The weight 426 that is attached to the metallic plate 424 for causing mechanical strain in the metallic plate 424 may be varied and properly selected to create a resonance in the PEG 421 at calculated frequencies to increase the vibration and the mechanical strain in the metallic plate 424, thereby increasing the electricity being generated therefrom.

Sixth Form

Referring to FIGS. 21 to 26, a wireless sensor assembly 510 constructed in accordance with a sixth form of the present disclosure may include a housing 512 and a sensor (not shown) that is connected to the electrical and electronic components inside the housing 512 by wires 514. The housing 512 has a rectangular configuration. The wireless sensor assembly 510 further includes a sensor connector 516 disposed at an end of the housing 512, and a cap 518 disposed at another end of the housing 512. As in wireless sensor assembly 410 of the sixth form, the wireless sensor assembly 510 includes electrical and electronic components disposed inside the housing 512. The electrical and electronic components may include a communication board 520, a self-powering device in the form of a piezoelectric generator (PEG) 522. The PEG 522 may include a metallic plate 524, and a weight 526 attached to an end of the metallic plate 524. The metallic plate 524 functions as a cantilevered board with the weight 526 disposed at the end to cause mechanical strain in the metallic plate 524. The mechanical strain generated in the metallic plate 524 is converted into power/ electricity, which is routed to the communications board 520 to power the sensor and other electrical/electronic components.

In any of the forms described herein, the raw sensing data acquired by the sensors 14 can be transmitted to an external computing device, such as a laptop, smartphone or tablet, so that processing of the raw sensing data can occur externally. The wireless sensor assemblies have the advantages of reducing power consumption since raw sensing data are processed externally. In addition, since the processing and calculations of the data are performed on an external or remote device, a more complete high-resolution look-up table may be used on the external or remote device to increase accuracy, as opposed to a less accurate polynomial curve fitting that is stored in a smaller ROM due to limited space available for the ROM in the sensor.

Further, the wireless sensor assemblies have the advantages of allowing for update on the calibration curves and the look-up tables without the need to change the circuitry of the sensors. Field replacement sensors are assigned with identification (ID) information or code, such as an RFID tag or a barcode. During installation or replacement of the wireless sensor assembly, calibration information of the external sensor 14 can be accessed through an external device in wireless communication with the wireless sensor assembly. By scanning or entering the ID information, the sensor 14 will be linked to a predetermined calibration curve via a network connection. In addition, the look-up table or calibration information can be periodically updated to account for drifts, thereby increasing measurement accuracy of the sensor 14 over the life of the sensor 14.

In one form of the wireless sensor assemblies as disclosed herein, the dimensions of the housing are approximately 1.75 in. L×1.25 in. W×0.68 in. H. When a battery is used, the housing may be larger. Due to the low power consumption of the Bluetooth component as the wireless component, which is less than 0.170 μW in one form of the present disclosure, the sensor 14 can be operated for at least 2 years with a selected battery while transmitting data every second. The low power consumption also makes self-powering possible. Moreover, in any of the wireless sensor assemblies described herein, the communications board can detect the amount of stored or generated energy and allow the sensor to automatically adjust the rate of transmitting the raw sensing data based on the amount of power available or predicted to be available.

The wireless sensor assembly according to any of the forms may be a digital sensing product that can transmit digital raw data to an external device or a remote device. The wireless sensor assembly includes interchangeable pieces to allow for easy assembly into multiple configurations, thus providing a "modular" construction. Each of the wireless sensor assemblies described herein can be varied to provide wired or wireless connectivity, and varied mounting and sensor input options.

While the wireless sensor assembly in any of the forms has been described to include only one sensor 14, more than one sensors may be connected to the electrical and electronics components inside the housing without departing from the scope of the present disclosure. For example, two or more sensors 14 may be inserted into the first aperture 26 and mounted by the mounting assembly 36 as shown in FIG. 6 and connected to the communication board 60 by two sensor connectors 66.

Seventh Form

A low-power wireless sensor system constructed in accordance with a seventh form of the present disclosure may include a plurality of wireless sensor assemblies, and a wireless network operatively connecting each of the wireless sensor assemblies and operable to transmit and receive data between each of the wireless sensor assemblies. The wireless sensor assemblies may be in the form of any of the wireless sensor assemblies described in the first to sixth forms and may communicate among themselves or with an external device, such as a tablet, a smartphone or a personal computer.

Eighth Form

Figure 27:
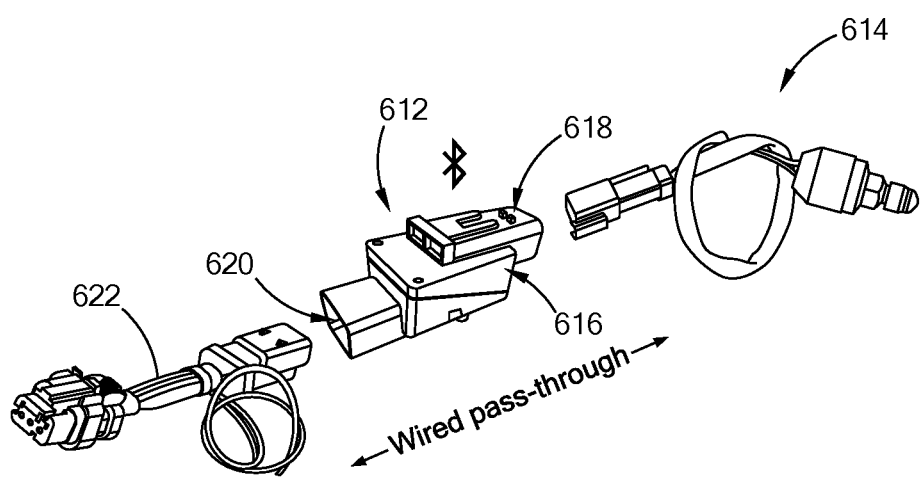
FIG. 27 is a perspective view of a wireless sensor assembly of an eighth form.

Referring to FIG. 27, a wireless sensor assembly 610 constructed in accordance with an eighth form of the present disclosure is a hybrid sensor assembly that can transmit data from a sensor to an external device wirelessly or using a wire harness. The wireless sensor assembly 610 includes a housing 612 and a sensor 614 connected to electrical and electronic components (not shown) disposed inside the housing 612. The housing 612 includes a main body 616 in which the electrical and electronic components are disposed, a first tubular portion 618 and a second tubular portion 620 extending from opposing ends of the main body 616 along a direction parallel to and offset from a longitudinal axis of the main body 616. The first tubular portion 618 defines a first aperture in which a first communication connector is disposed to form a first communication port for receiving an end of the sensor 614. The second tubular portion 620 defines a second aperture in which a second communication connector is disposed to form a second communication port. The second communication port may be a Universal Serial Bus (USB) port, a USB-C port, an Ethernet port, a Controller Area Network (CAN) bus port and Aspirated TIP/Ethernet port, among others. The second communication port is configured to receive an end of a wire harness 622.

Figure 28:
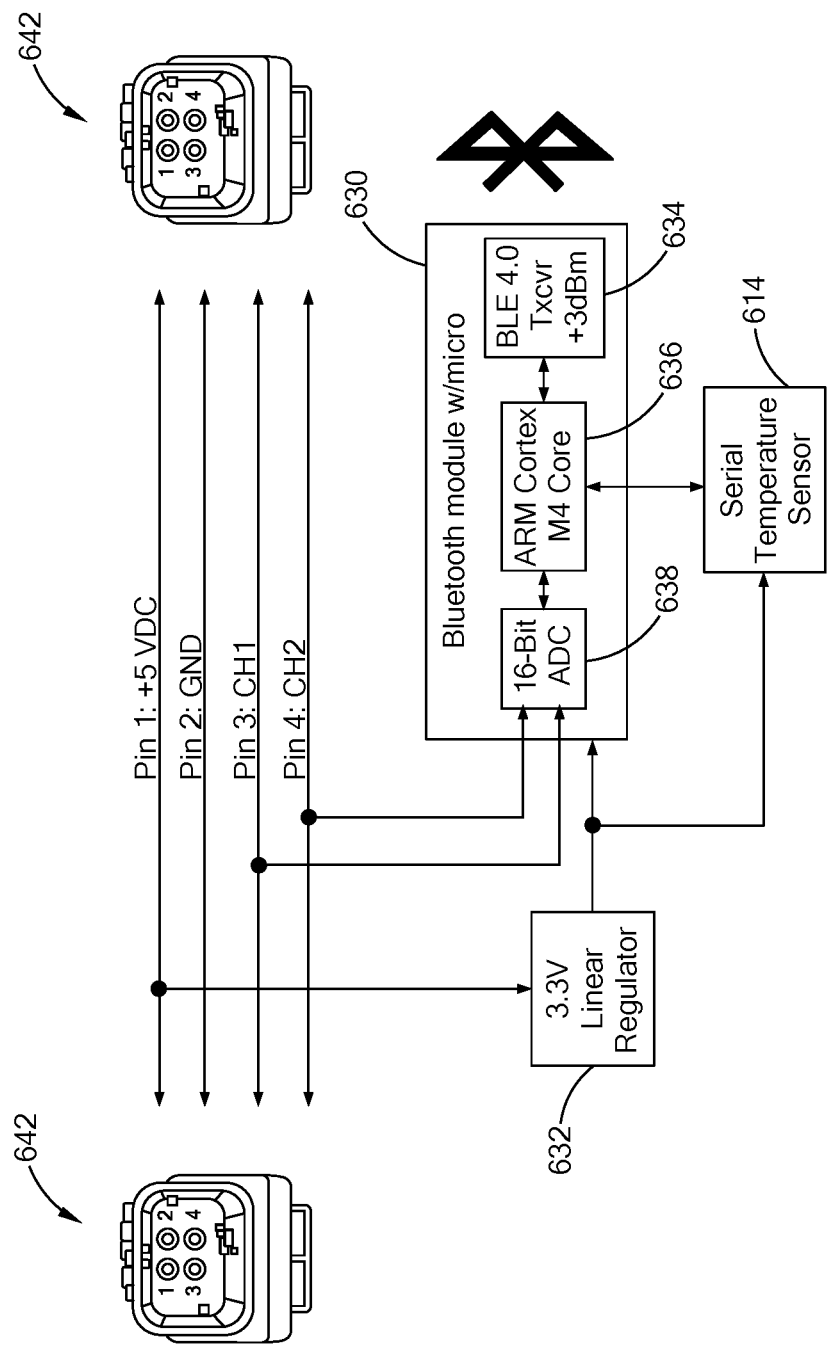
FIG. 28 is a schematic diagram of electronics disposed in the wireless sensor assembly of the eighth form.

Referring to FIG. 28, the electrical and electronic components inside the housing 612 include a wireless module 630 for wirelessly transmitting data from the sensor 614 to an external device (not shown), a wireless power source (not shown in FIG. 28) similar to the wireless power source 19 shown in FIG. 2, and a linear regulator 632. The external device is a remote device, including but not limited to, a tablet, a smartphone, a personal computer, a cloud computer center, or any processing device, which can process the data transmitted from a wireless communications component of the wireless module 630. The sensor 614 only collects raw data and transmits the raw data to the external or remote device before going to sleep. All sensing calculations, calibration adjustments, error checking, etc., are performed on the external or remote device so as not to use up any stored energy in the wireless power source disposed within the housing 612.

The wireless module 630 may include a wireless communication component in the form of a Bluetooth® RF Transmitter 634, a processor 636, and an analogous digital converter (ADC) 638. The processor 636 manages a rate of data transmittal from the wireless communications component 634 to the external device (not shown). The processor 636 may be an ARM Cortex M4 Core. The ADC 638 may be a 16-bit, four-channel ADC. The second communication port for the wire harness 622 may include four pins.

Referring back to FIG. 27, in the current form, the wireless module 630, the wireless power source, and the linear regulator 632 are integrated into a circuit board fixed to and disposed inside the housing 612. The sensor 614 acquire information relating to temperature, pressure, etc. from the object or environment to be detected. The raw data from the sensor 614 may be wirelessly transmitted to the external device for further processing by using the wireless module 630. When the wire harness 622 is inserted into the second communication port, the raw data from the sensor 614 may be transmitted to the external device by the wire harness 622. The electrical and electronic components may include a circuitry to disable the wireless communication component 634 when the wire harness 622 is inserted into the second communication port. Therefore, the wireless sensor assembly 610 is a hybrid sensor assembly that can transmit data from the sensor 614 wirelessly or using the wire harness 622.

Alternatively, the wire harness 622 may be connected to a computer or an engine control unit (ECU), separate from the external device. The data from the sensor 614 may be transmitted wireless to the external device through the wireless module 630 for determining the measurements of the sensor 614. The data from the sensor 614 may also be transmitted to the computer or ECU by the wire harness 622 for preventative maintenance purposes, other than for providing readings of the measurements.

Ninth Form

A wireless sensor assembly constructed in accordance with a ninth form of the present disclosure is structurally similar to that of FIG. 27 except that the wireless module may be provided in a removable dongle that can be removably inserted into the second communication port to connect the circuit board inside the housing 612. The same second communication port is also configured to connect to a wire harness 622. Therefore, the wireless sensor assembly is a hybrid modular sensor assembly that can transmit raw data from the sensor 614 to the external device by using a wire harness 622 insertable into the second communication port or by using a wireless module provided in the removable dongle which is also insertable into the second communication port. The removable dongle may include a four-pin communication interface 642 for engaging the second communication port.

It should be noted that the disclosure is not limited to the form described and illustrated as examples. A large variety of modifications have been described and more are part of the knowledge of the person skilled in the art. These and further modifications as well as any replacement by technical equivalents may be added to the description and figures, without leaving the scope of the protection of the disclosure and of the present patent.

What is claimed is:

1. A wireless sensor assembly comprising:
   a housing defining a first aperture for receiving an external sensor and a second aperture defining a communication port;
   a wireless power source;
   a wireless communications component powered by the wireless power source and configured to be in electrical communication with the external sensor and transmit data from the external sensor to an external device; and
   firmware powered by the wireless power source and configured to manage a rate of data transmittal from the wireless communications component to the external device,
   wherein the wireless power source, the wireless communications component, and the firmware are mounted within the same housing, the communication port being configured to receive a wire harness, the data from the external sensor being transmitted from the external sensor wirelessly through the wireless communications component or through the wire harness to the external device for processing.

2. The wireless sensor assembly according to claim 1, wherein the wireless power source is an energy harvesting device.

3. The wireless sensor assembly according to claim 2, wherein the firmware controls the rate of data transmittal from the wireless communications component to ensure that an average power consumption is within the capability of the energy harvesting device.

4. The wireless sensor assembly according to claim 1, wherein the wireless sensor assembly defines a volume less than 2 in$^3$.

5. The wireless sensor assembly according to claim 1, wherein the wire harness is configured to transmit the data from the external sensor to another external device for preventive maintenance purposes.

6. The wireless sensor assembly according to claim 5, wherein the another external device is selected from a group consisting of an Engine Control Unit and a computer.

7. The wireless sensor assembly according to claim 1, wherein the communication port is also configured to receive a removable dongle.

8. The wireless sensor assembly according to claim 7, wherein the wireless communications component is provided in the removable dongle.

9. The wireless sensor assembly according to claim 1, wherein the communication port is configured to be adapted for both the wire harness and a removable dongle.

10. The wireless sensor assembly according to claim 1, wherein the housing includes a main body, a first tubular portion and a second tubular portion extending from the main body along a direction parallel to a longitudinal axis of the main body.

11. The wireless sensor assembly according to claim 10, wherein the first tubular portion and the second tubular portion extending from opposing ends of the main body and being offset from the longitudinal axis of the main body.

12. The wireless sensor assembly according to claim 1, wherein the wireless communications component and the firmware are powered exclusively by the wireless power source.

13. The wireless sensor assembly according to claim 12, wherein the wireless power source is selected from the group consisting of a self-powering device, a thermoelectric device, and a battery.

14. The wireless sensor assembly according to claim 13, wherein the self-powering device is a vibration device comprising a piezo-electric device mounted to a cantilevered board.

15. The wireless sensor assembly according to claim 1, further comprising a communication connector received in the second aperture, wherein the communications connector is selected from the group consisting of USB, USB-C, Ethernet, CAN, and Aspirated TIP/Ethernet.

16. The wireless sensor assembly according to claim 1, wherein the external sensor is selected from the group consisting of a temperature sensor, a pressure sensor, a gas sensor, and an optical sensor.

17. The wireless sensor assembly according to claim 1, wherein the wireless communications component is selected from the group consisting of a Bluetooth module, a WiFi module, and a LiFi module.

18. The wireless sensor assembly according to claim 1, wherein the external sensor includes an identification code, wherein during installation or replacement of the wireless sensor assembly, calibration information of the external sensor can be accessed through an external device in wireless communication with the wireless sensor assembly.

19. The wireless sensor assembly according to claim 18, wherein the identification code is at least one of an RFID tag and a barcode.

20. The wireless sensor assembly according to claim 19, wherein the wireless communications component sends the data to the external device, and the external device performs functions selected from the group consisting of data logging, computations, and re-transmitting the data to a remote device for processing.

* * * * *